G. J. MOORE.
LIGHTNING ROD.
APPLICATION FILED JULY 16, 1909.

950,454.

Patented Feb. 22, 1910.

Witnesses
F. C. Gibson.
V. B. Hillyard.

Inventor
George J. Moore.

By Victor J. Evans
Attorney

UNITED STATES PATENT OFFICE.

GEORGE J. MOORE, OF MARYVILLE, MISSOURI, ASSIGNOR TO MOORE BROTHERS LIGHTNING ROD COMPANY, OF MARYVILLE, MISSOURI.

LIGHTNING-ROD.

950,454.   Specification of Letters Patent.   Patented Feb. 22, 1910.

Application filed July 16, 1909.   Serial No. 507,937.

*To all whom it may concern:*

Be it known that I, GEORGE J. MOORE, a citizen of the United States, residing at Maryville, in the county of Nodaway and State of Missouri, have invented new and useful Improvements in Lightning-Rods, of which the following is a specification.

The chief intent of the present invention is the provision of a cable designed most especially for use as a conductor for lightning to safely convey the fluid to the ground without endangering that to which the conductor is applied.

The invention relates to lightning conductors of the variety comprising a plurality of elements which are connected to form in effect a cable or like structure comprising a series of strands closely related and held in fixed position by being intertwisted or wound spirally about one another.

The conductor comprises a plurality of elements or cables which are bound together in a peculiar manner, each cable consisting of two strands, one strand being straight and the other strand wound spirally about the straight strand. This construction prevents compressing the strands to such an extent as to disturb the molecular structure thereby providing a structure possessing high conductivity, the cables or elements being wound spirally, those upon the outer layer extending in a spiral direction the reverse of the next adjacent layer with the result that a maximum space is provided between the layers and the individual cables or elements so that the structure as a whole is highly efficient for the purposes designed.

Figure 1:
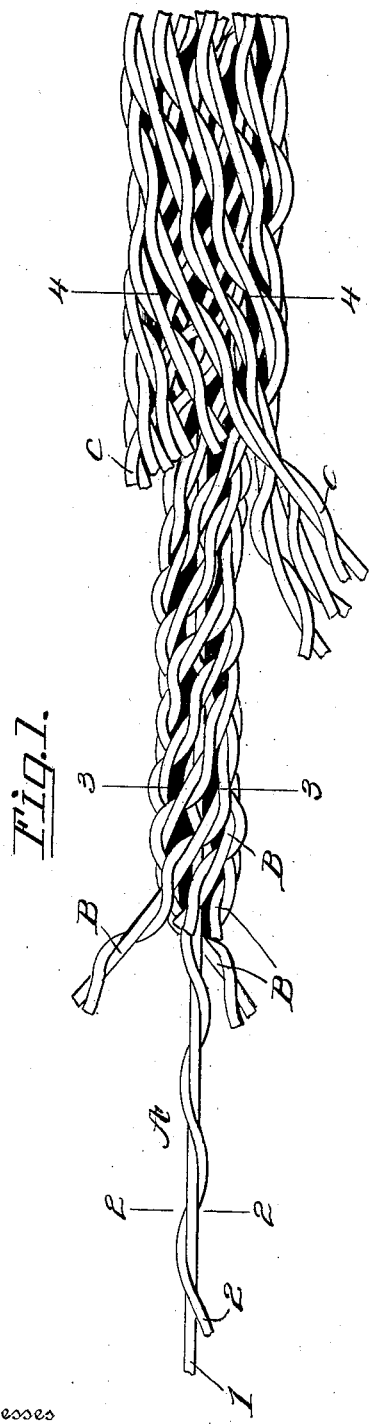
Figure 4:
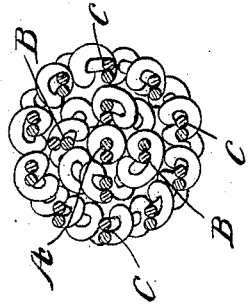
Figure 3:
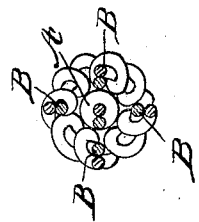
Figure 2:
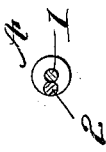

In addition to the advantages herein indicated others will appear to those skilled in the art as the nature and details of the invention are understood and for this purpose reference is to be had to the following description and the drawings hereto attached in which, Figure 1 is a side view of a portion of a lightning conductor embodying the invention, the several layers being broken away to show more clearly the arrangement of the cables or elements. Fig. 2 is a section of the core cable or element on the line 2—2 Fig. 1. Fig. 3 is a section of the core and surrounding layers or elements on the line 3—3 Fig. 1. Fig. 4 is a transverse section of the complete conductor on the line 4—4 Fig. 1.

Corresponding and like parts are referred to in both views of the drawings by the same reference characters.

The conductor resembles in general structure a cable and is formed of a series of small cables or like elements or strands, each cable or element being formed exactly alike and consisting of a straight wire 1 and a spiral wire 2 encircling the straight wire. The element or wire 2 is wrapped about the straight wire 1 in a long spiral thereby preventing compressing and disturbing the molecular structure of the wires such as results from the uniform intertwisting of two or more wires or strands in the formation of a cable or cable element. Moreover this construction results in the provision of ample spaces between a number of such small cables or strands when a number are bound together in the formation of a large cable.

In constructing a cable or conductor in accordance with this invention a number of small cables or strands are brought together. One of the strands or cables constitute a core as indicated at A about which a series of cables or strands are wound. The straight wire 1 of the core A occupies a central position. The wire 2 is wound about the straight wire 1 spirally in one direction throughout the length of the cable. A series of cables B are grouped about the core A and constitute the first layer. These cables or strands B are wound spirally about the core A in an opposite direction to the spiral winding of the wire 2 of said core as indicated most clearly in Fig. 1 with the result that spaces are provided between the several cables or strands B and between said cables B and the core A. Other cables or strands C are arranged about the cable formed as a result of wrapping the cables B about the core or cable A and these cables or strands C constitute a second layer and are wound spirally about the cables B in an opposite direction to the spiral windings of said cables B. This is clearly indicated in Fig. 1. Usually two layers are sufficient to provide a lightning conductor producing satisfactory results but it is to be understood that a cable or lightning conductor constructed in accordance with this invention may embody any number of layers it being necessary only within the spirit of the invention that each cable or strand comprises a straight wire and an encircling spirally wound wire and that the cables or strands of the several layers or strands be wound spirally in a direction opposite to the adjacent strands. It is further noted that each layer may consist of any number of strands or cables according to the relative size of the wires 1 and 2 employed in the formation of the small cables or strands. As shown in the drawings the second layer comprises four cables or strands and the outermost or second layer is formed of ten small cables or strands C thereby making fifteen small cables in the complete conductor of thirty wires or like elements in the completed structure.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what is claimed as new is:—

1. A conductor formed of a plurality of small cables, each cable consisting of a straight wire and a second wire wrapped spirally about the straight wire, one of such cables constituting a core with the straight wire occupying a central position and a series of small cables wrapped about the core in a spiral direction opposite to the spiral winding of the wire about the straight wire of said core.

2. A conducting cable for the purposes specified comprising a plurality of small cables grouped in layers, each cable consisting of a straight wire and a second wire wound spirally therearound, and the cables of one layer being wound spirally in an opposite direction to the spiral winding of the cables of the adjacent layer.

3. A conductor comprising a core and a series of cables grouped about the core in layers, the core and each cable consisting of a straight wire and a second wire wound spirally therearound, the cables comprising the first layer being wrapped spirally about the core in an opposite direction to the spiral winding of the second wire of said core about the straight wire, and the cables of the second layer being wrapped spirally about the cables of the first layer in a direction opposite to the spiral winding of the cables comprising said first layer.

In testimony whereof I affix my signature in presence of two witnesses.

GEORGE J. MOORE.

Witnesses:
 DAVID C. MOORE,
 ULYSSES I. WILLSON.